United States Patent [19]
Shaw

[11] Patent Number: 5,871,273
[45] Date of Patent: Feb. 16, 1999

[54] OPTICAL LIGHT PIPING REFLECTOR ELEMENT FOR BACKLIGHTING LIQUID CRYSTAL DISPLAYS

[75] Inventor: James E. Shaw, Cedar Rapids, Iowa

[73] Assignee: Rockwell International, Costa Mesa, Calif.

[21] Appl. No.: 315,052

[22] Filed: Sep. 29, 1994

[51] Int. Cl.⁶ .................................................... F21V 7/12
[52] U.S. Cl. ......................... 362/247; 362/225; 362/299; 362/300; 362/327
[58] Field of Search ................................ 359/48–50, 599, 359/618, 627, 851, 853; 362/224, 225, 298, 299, 300, 327, 348, 247, 301, 330, 332, 333, 339; 40/582, 583

[56] References Cited

U.S. PATENT DOCUMENTS

| | | | |
|---|---|---|---|
| 3,814,504 | 6/1974 | Brady et al. | 359/627 |
| 4,599,684 | 7/1986 | Lee | 362/301 |
| 4,630,905 | 12/1986 | Blom | 359/851 |
| 4,641,226 | 2/1987 | Kratz | 362/301 |
| 5,143,433 | 9/1992 | Farrell | 362/29 |
| 5,253,151 | 10/1993 | Mepham et al. | 362/216 |

FOREIGN PATENT DOCUMENTS

| | | | |
|---|---|---|---|
| 0027261 | 3/1897 | United Kingdom | 362/301 |
| 0302656 | 10/1929 | United Kingdom | 362/299 |

*Primary Examiner*—Alan Cariaso
*Attorney, Agent, or Firm*—Kyle Eppele; James P. O'Shaughnessy

[57] ABSTRACT

A backlight for liquid crystal displays which includes several closely spaced lamps and a sculptured optic element disposed behind the lamps wherein, the sculptured optic element has a reflective back side and a partially reflective front side and an optically transmissive medium disposed there between. The optic element being sculptured so as to direct light rays emanating from the back of the lamps and from the side of the lamps in a direction away from colliding with other lamps and in a direction toward the median surface. The optic element essentially gathers light from behind and between the lamps and directs it in a direction toward the viewing surface.

3 Claims, 2 Drawing Sheets

OPTICAL LIGHT PIPING REFLECTOR ELEMENT FOR BACKLIGHTING LIQUID CRYSTAL DISPLAYS

FIELD OF THE INVENTION

The present invention generally relates to liquid crystal displays (LCDs) and more particularly relates to backlights for such displays, and even more particularly relates to reflector elements for such backlights.

BACKGROUND OF THE INVENTION

In the past, LCDs have utilized reflectors to reflect light from the backside of fluorescent lamps in a forward direction so as to more efficiently project all light emitted by the fluorescent lamp. One such design is shown in U.S. Pat. No. 5,253,151 entitled "Luminare For Use in Backlighting A Liquid Crystal Display" issued to Thomas A. Mepham et al., on Oct. 12, 1993, which patent is hereby incorporated herein in its entirety by this reference. While this design is capable of providing much increased light efficiencies in LCDs it has some drawbacks when used in some limited applications. For example, when the lamps, or segments of lamps, are very closely spaced to each other or when the lamp is very close to a side wall of the backlight, light rays from one lamp, or segment, may be blocked by another lamp, or lamp segment, or by the side wall.

Consequently, there exists a need for improvement in backlights for liquid crystal displays which provides for enhanced total transmittance when several lamps are very closely spaced or are spaced close to backlight side walls or other projected incomberments. Additional advantages include partial collimation of the "backside" energy of the lamp. Certain display applications have shown significant optical performance benefits from collimated backlighting.

SUMMARY OF THE INVENTION

It is an object of the present invention to increase the total transmittance of a LCD backlight by reducing the amount of unrecoverable energy within the luminaire.

It is a feature of the present invention to include a light piping reflector.

It is an advantage of the present invention to reduce the amount of light blocked by other lamp segments and by the backlight side wall.

The present invention provides an improved LCD backlight which is designed to satisfy the aforementioned needs, produce the earlier mentioned objects, contain the above described features and achieve the previously stated advantages. The invention is carried out in a "lamp absorption-less" system in the sense that the light emitted from one lamp segment and incident on and absorbed by another lamp segment has been greatly reduced. Instead, a sculptured optical element with a reflective back surface and a partially reflective front surface is used so that light that might otherwise strike a neighboring lamp segment is "pumped" between the lamp segments by the optical element and thereby increasing the total light output of the backlight.

BRIEF DESCRIPTION OF THE DRAWINGS

The invention may be more fully understood by reading the following detailed description in conjunction with the appended drawings, wherein.

DETAILED DESCRIPTION OF THE INVENTION

Figure 1:
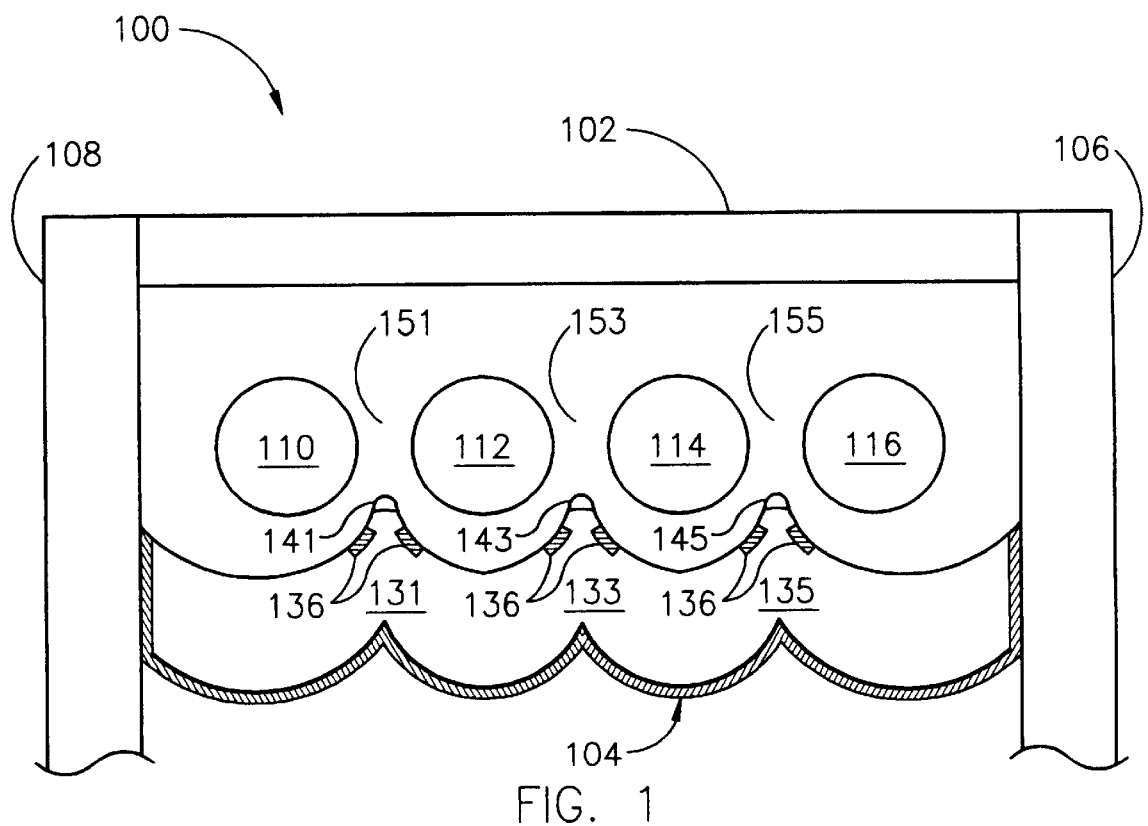
FIG. 1 is a cross sectional view of an LCD backlight, of the present invention, showing four closely spaced lamp segments and a reflector/optical element disposed between and behind such lamp segments.

Now referring to the drawings, where like numerals refer to like matter and text throughout, there is shown a liquid crystal display backlight, generally designated 100, having an image side 102 and a reflector side 104, a first side 106 and a second side 108. Shown disposed within backlight 100 are fluorescent lamps 110, 112, 114, and 116. These lamps may be individual lamps with individual filaments for each or may be a segment of a serpentine or irregularly shaped lamp or any combination thereof which is well known in the art. Additionally, lamps other than fluorescent lamps may be substituted including but not limited to incandescent lamps, halogen, mercury vapor, sodium lamps or other sources of luminous intensity. Shown disposed near the reflector end 104 of the backlight 100 is optical element 120 having a lamp side 122 and a back side 124. Disposed on back side 124 is back side reflector 125. Preferably, optical element 120 is a clear optical element and is made of plastic, glass, air or other suitable optical medium. Lamp side 122 of optical element 120 is shown in a generally scalloped configuration having peaks 131, 133, and 135 disposed between the lamps 110, 112, 114, and 116. The sides of the peaks 131, 133, and 135 are coated with a lamp side reflective coating 136 so that light incident thereon from outside of the optical element 120 is reflected and light incident thereon from inside the element 120 is also reflected. Preferable reflective coating 136 and reflector 125 are constructed as follows: The tops of peaks 131, 133 and 135 are preferably uncoated plateaus 141, 143, and 145 respectively. Disposed on plateaus 141, 143, and 145 are lenses 151, 153, and 155 respectively. However, plateaus 141, 143, and 145 may be left uncoated and without lenses 151, 153, and 155 if the optical advantages provided by such lenses are not desired.

Figure 2:
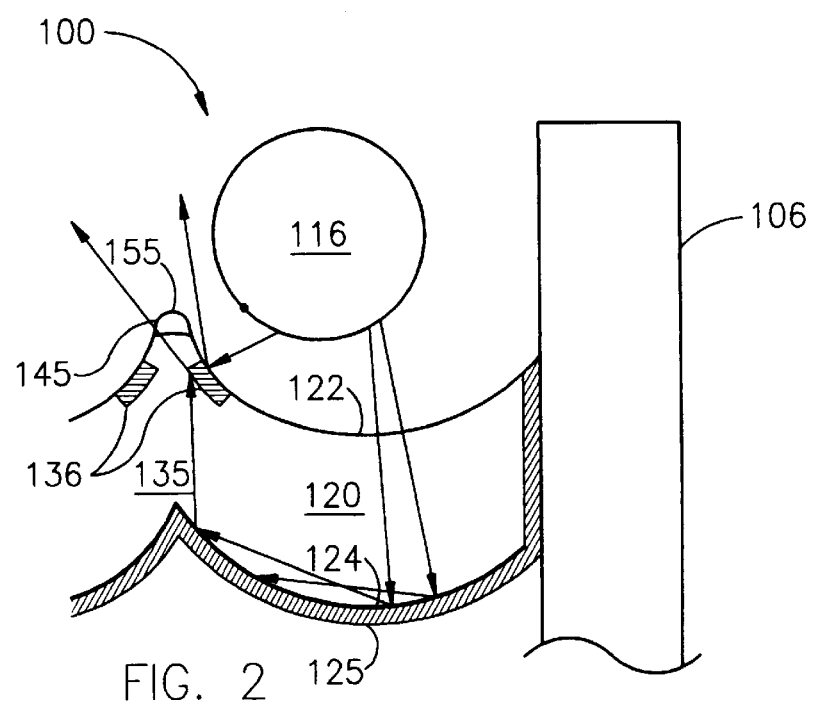
FIG. 2 is an enlarged view of the right side of FIG. 1, with additional representative light rays drawn therein.

Now referring to FIG. 2, is shown an enlarged view of a portion of the backlight 100. Numerous light rays are represented to demonstrate the paths of representative light emitted from the lamp.

In operation and now referring to both FIGS. 1 and 2, it can be seen that the total light output and uniformity of lamp luminance is increased by the present invention because the light rays emitted between the lamp and the reflector 125 and the light rays emitted in a direction that would typically strike another lamp and be re-absorbed by the phosphor or like optical source are reflected off the reflectors 125 and 136 and then in a direction toward the front of the lamp.

The shape and depth of the scalloped nature of the optical element 120 and the dimension of the coated surface 136 and the lens characteristics are a matter of design choice and are certainly a function of the lamp size and the lamp separation.

Referring to FIGS. 1 and 2, the energy emitted from plateaus 141, 143 and 145 can be directed by design due to the channeling effects from the reflective coating 136 and 125, by selecting the appropriate lens shape 151, 153 and 155. This allows for partial collimation of the backside energy of the lamp. Complete collimation of the luminaire could be accomplished with the addition of a micro-optic lens array. The advantage of the described invention is due to the high probability of coupling the light emitted from the lenses 151, 153 and 155 to the acceptance angle of the micro-optic array. The described design is inevently efficient due to the partial collimation of the energy from the backside of the lamp. Certain LCD optical system applications require this type of treatment of the backlight in order to improve compensated grayscale and contrast performance over viewing angle as well as LCD rear projection applications.

Figure 3:
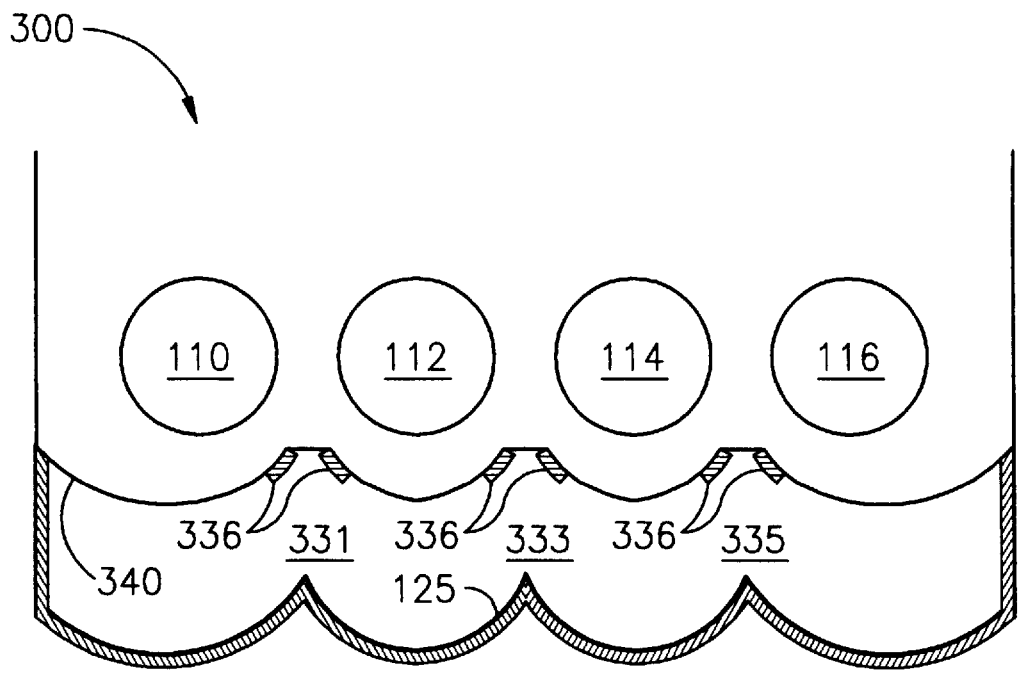
FIG. 3 is a cross sectional view of an LCD backlight of the present invention which includes two separately spaced reflectors with an open space therebetween.

Now referring to FIG. 3, there is shown a backlight, of the present invention, generally designated 300, having a first reflector assembly 340 and a back side reflector 125. The first reflector 340 may be a scalloped shaped lens with reflective coatings 336 placed in the peaks 331, 333 and 335 of the lens 340. Lens 340 and back side reflector 125 are separated by an optically transparent medium, such as air, other gasses, or any transparent, or relatively transparent medium.

Figure 4:
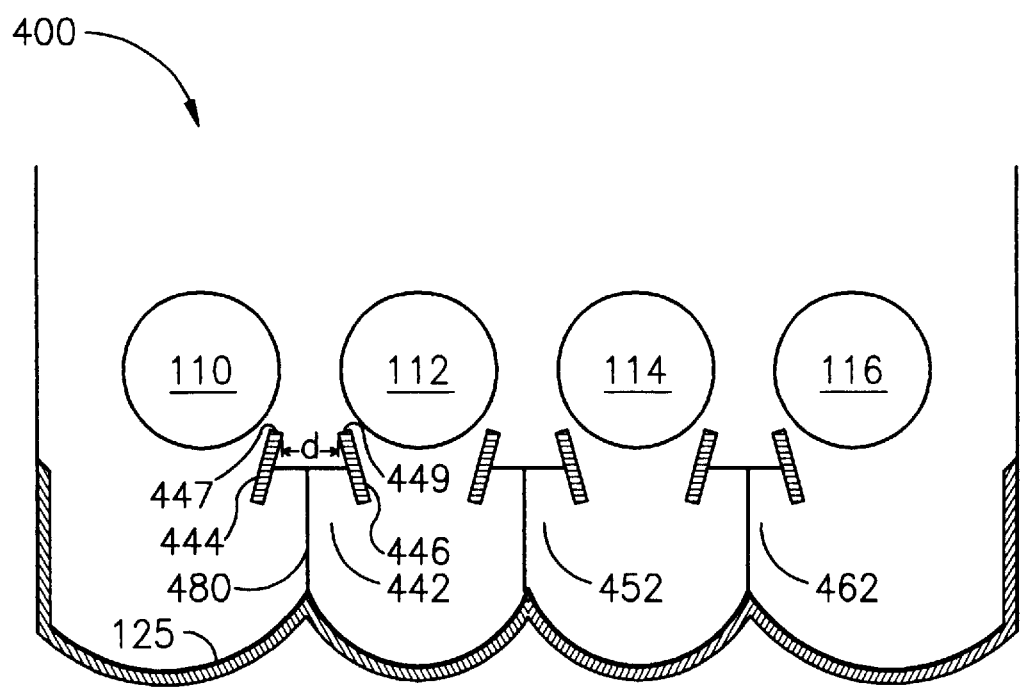
FIG. 4 is a cross sectional view of a reflector assembly of the present invention which includes a plurality of pairs of double sided mirrors disposed between lamps.

Now referring FIG. 4, there is shown another embodiment of the present invention, generally designated 400, having a back side reflector 125 and a plurality of pairs of mirrors 442, 452 and 462. Pair 442 is shown having a first double sided mirror 444 and a second double sided mirror 446 which have top sides 447 and 449 respectively. Top sides 449 and 447 are separated by a predetermined distance d to permit light passive therethrough. Pairs of lenses 442, 452 and 462 are held in place by mechanical structure 480 which is designed to maintain separation between the individual reflectors or mirrors and the back side reflector 125. This could be structures such as wires, cast structural materials, machined metal or molded plastic components.

Throughout the description of the invention the backlight has been described as for use with an LCD. The present invention is applicable to any reflector lamp assembly regardless of what, if any thing, is placed across the image side 102.

It is thought that the backlight of the present invention and many of its attendant advantages will be understood from the aforegoing description, and it will be apparent that various changes may be made in the form, the construction and the arrangement of the parts, without departing from the spirit and scope of the invention or sacrificing all of their material advantages. The form herein described is merely a preferred or exemplary embodiment thereof.

I claim:
1. A backlight for a display comprising:
    a box having a viewing side, an opposing backside;
    a plurality of the lamp segments, disposed in said box between said viewing side and said backside;
    said plurality of lamp segments being separated by a plurality of gaps;
    an optical element disposed between said plurality of lamp segments and said backside;
    said optical element having a lamp side and a rear side, said lamp side being disposed near said plurality of lamp segments then said rear side;
    said optical element lamp side containing a plurality of concave troughs, each having side walls and a bottom, said plurality of troughs separated by a plurality of plateau regions;
    said optical element further having a plurality of sculptured troughs and a plurality of peak regions therebetween disposed on said rear side;
    said plurality of plateau regions extending into said plurality of gaps;
    said lamp side of said optical element having double sided reflecting material disposed on said side walls, but not on said bottom or on said plateaus; and,
    said rear side having a reflecting material disposed thereon.
2. A backlight of claim 1 wherein said optical element is constructed of glass.
3. A backlight of claim 2 further comprising a plurality of lenses disposed on said plurality of plateau regions.

* * * * *